Dec. 2, 1969 R. YII 3,482,109

VARIABLE COUNT MAGNETIC CORE

Filed Feb. 23, 1966

INVENTOR.
ROLAND YII

BY Robert A. Green

ATTORNEY

United States Patent Office 3,482,109
Patented Dec. 2, 1969

3,482,109

VARIABLE COUNT MAGNETIC CORE

Roland Yii, Norristown, Pa., assignor to Burroughs Corporation, Detroit, Mich., a corporation of Michigan Filed Feb. 23, 1966, Ser. No. 529,519
Int. Cl. H01f 27/42, 29/08
U.S. Cl. 307—88 2 Claims

ABSTRACT OF THE DISCLOSURE

A variable count counter includes a triggerable free-running multivibrator which comprises a core of magnetic material having a first transistor coupled to it to switch it in one direction and a second transistor coupled to it to switch it in the opposite direction, the two switching operations being free-running until stopped by the application to the circuit of a suitable external pulse. The core of the multivibrator is also coupled by an output winding to a second magnetic core circuit in which the core is biased so that it switches only after a variable number of pulses is received, depending on the bias. The second core also includes means for resetting the second core after it switches and for feeding a blocking signal back to the multivibrator.

This invention relates to electronic circuits using magnetic cores.

The present invention discloses a novel triggerable multivibrator circuit using magnetic cores, the circuit comprising a building block with which various counting circuits and calculating circuits may be constructed. The triggerable multivibrator of the invention comprises a core of magnetic material having an essentially rectangular hysteresis loop which carries a first pair of windings associated with first means for setting the core from a first state defined as "0" state, to a second state defined as "1" state, and a second pair of windings associated with second means for resetting the core from the second state to the first state. The pairs of windings and the first and second setting and resetting means are so arranged that, when the first is triggered by an input pulse, it in turn operates the second, and then the second operates the first, etc., so that the core is continually set and reset automatically. This operation continues until it is stopped by the application to the circuit of a suitable external pulse. This basic triggerable multivibrator is coupled to other core circuits to provide novel counting and variable pulse train generating circuits which may be used, among other things, to perform arithmetic operations.

The invention is described in greater detail by reference to the drawing wherein.

In the following description of the invention, it is understood that current into the dotted terminal of one winding on a core induces current out of the dotted terminals of all other windings on the same core, and, by convention, current into the dotted terminal of a winding sets the core, and current into a non-dotted terminal of a winding resets the core. The set state of a core is also known as the "1" state or state of positive magnetic remanence, and the reset state is known as the "0" state or state of negative magnetic remanence.

Figure 1:
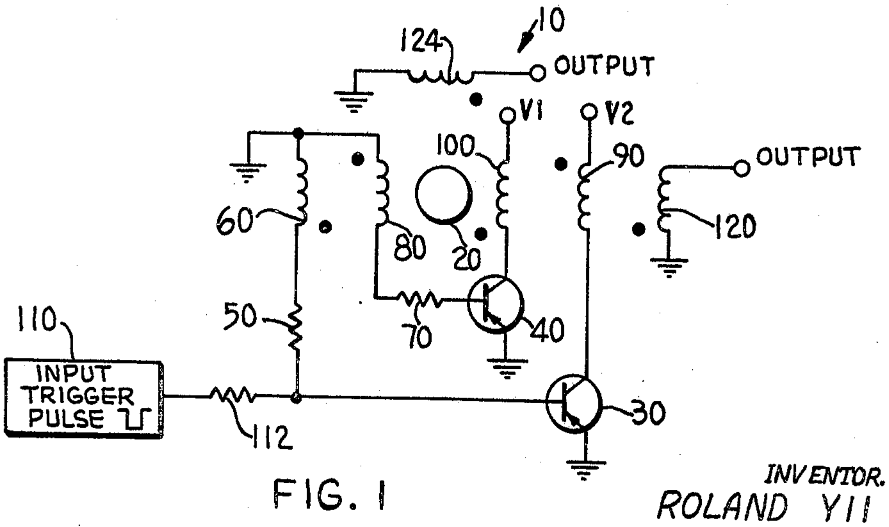
FIG. 1 is a schematic representation of a multivibrator circuit embodying the invention.

The triggerable multivibrator of the invention 10, referring to FIG. 1, includes a core 20 of magnetic material having a rectangular hysteresis loop. Two switching circuits are provided for setting and resetting the core. Any suitable means may be used to perform the switching function, including electron tubes, transistors, or the like. Transistors 30 and 40, particularly PNP transistors, are shown in FIG. 1. However, NPN transistors may be used with the proper reversal of bias voltages. In the circuit 10, transistor 30 is connected as the core setting means and transistor 40 is connected as the core resetting means. The base electrode of the "set" transistor 30 is coupled through a resistive path 50 and first winding 60 on the core 20 to a source of reference potential such as ground. The base electrode of the "reset" transistor 40 is similarly connected through a resistive path 70 and a winding 80 on the core to ground. It is noted that the two base windings are oppositely connected, with the base of transistor 30 being coupled to a dotted terminal through resistor 50 and the base of transistor 40 being coupled to the non-dotted terminal of winding 80 through resistor 70. Both transistors have their emitter electrodes grounded, and their collector electrodes coupled through core windings 90 and 100, respectively, to suitable negative D.C. power supplies V1 and V2. The two collector windings 90 and 100 are so connected that the collector of transistor 30 is coupled to a non-dotted terminal and the collector of transistor 40 connected to a dotted terminal. A source of 110 of negative trigger pulses is coupled through a suitable resistive path 112 to the input of the triggerable multivibrator. The core 20 carries output windings 120 and 124.

Figure 2:
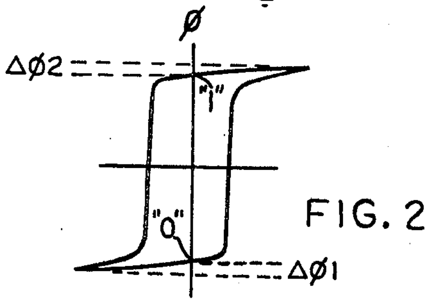
FIG. 2 is a representation of a typical hysteresis curve for the magnetic core of FIG. 1.

In operation of the circuit of FIG. 1, assuming that the core 20 is in the "1" state and neither transistor 30 nor 40 is "on," a negative input trigger pulse from source 110 is applied to the base or input of transistor 30 and switches this transistor on. When transistor 30 turns on, current flows through windings 60 and 90, and, the arrangement is such that the current through winding 90 provides a magnetomotive force which overrides the magnetomotive force due to current flow in the winding 60 and drives the core 20 into negative saturation. After the removal of the input trigger pulse, the core 20 settles back from negative saturation to its stable negative remanent point "0." The flux change $\Delta\phi 1$ which results (FIG. 2) causes a negative voltage pulse to be developed at all non-dot terminals of the windings, including winding 80, on core 20. This negative pulse is applied to the base electrode of the reset transistor 40, which is thus switched on. This produces current flow through the winding 100 which drives the core 20 in the direction of positive saturation.

As the core is driven to positive saturation and then returns from positive saturation to the stable "1" state, the flux change $\Delta\phi 2$ causes a negative pulse to be generated at the dotted terminals of all windings on core 20, including winding 60. This negative pulse, applied to the base of transistor 30, turns on transistor 30 and causes the core 20 to be reset to the "0" state. In this way, the transistors 30 and 40 automatically and alternately turn each other on, and alternately set and reset core 20 until a suitable external positive pulse is applied to the base of one of the transistors 30 or 40 to stop the oscillation.

Figure 3:
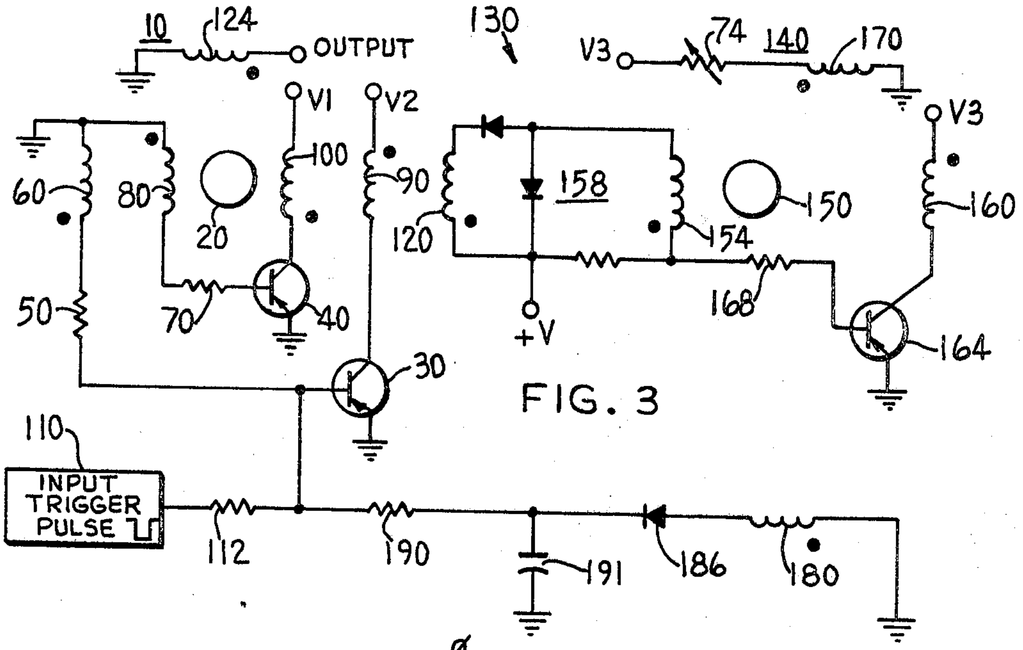
FIG. 3 is a schematic representation of a variable pulse train generator circuit embodying the invention.

The multivibrator 10 may be used in a variable pulse train generating circuit 130, shown in FIG. 3, which is suitable for performing a multiplication operation. In circuit 130, the multivibrator 10 is coupled with a saturable magnetic core pulse generating circuit 140 which includes a core 150 of magnetic material having a rectangular hysteresis loop. The core 150 carries an input winding 154 which is part of a coupling loop 158 between core 20 and core 150. The coupling loop 158 also includes winding 120, which is the output winding of the core 20 in multivibrator circuit 10. The core 150 also carries a reset winding 160 which is connected in the collector circuit of a transistor 164, the base of which is coupled through a resistive path 168 to the dotted terminal of the input winding 154. The core also carries a bias winding 170 which is connected as shown from ground through a variable resistor 174 to a positive D.C. bias source V3. The core 150 also carries an output or feedback winding 180 which is coupled through a diode 186 and a resistive path 190 to the base of transistor 30 of multivibrator 10. A by-pass capacitor 191 is provided for minimizing noise.

In operation of the pulse generating circuit 140, the number of steps or the number of input pulses required to switch the core 150 from the "0" state to the "1" state is determined by the bias applied to the core through winding 170 by adjustment of resistor 174. The constant current bias which is applied effectively shifts the $\phi$-axis (FIG. 2) either to the right which represents forward bias, or to the lift which represents reverse bias. Forward bias increases the effective magnetomotive force of input pulses and reduces the flux fallback so that the total number of pulses required to switch a core is reduced. Reverse bias has the opposite effect and increases the number of pulses required to switch a core. Input pulses are applied to the core 150 of counter 140 from the multivibrator 10 through the coupling loop 158.

After the multivibrator 10 is triggered to oscillate and when the core 20 is switched from the "0" state to the "1" state, a negative output pulse is generated at the non-dotted terminal of winding 120 and is coupled through the coupling loop 158 to the core 150. When the required number of these input pulses has been applied, the core 150 is driven into saturation and a sufficiently large negative voltage appears at the base of the switching transistor 164 to turn on this transistor. The resultant current in the collector winding 160 resets the core 150 and generates a positive pulse at the non-dotted terminal of feedback winding 180. This pulse is coupled to the base of transistor 30 to turn off the multivibrator and the entire circuit 130. The timing is such that this turn-off pulse is applied to transistor 30 prior to its being turned on by the switching of the core 20 of the multivibrator 10.

The circuit of FIG. 3 can be used as a multiplier circuit as follows: The number of input pulses (each of which triggers on the multivibrator to generate a train of pulses) can be treated as the multiplicand, and the number of pulses in each train can be treated as the multiplier. The numerical value of the multiplier is fixed by the bias setting on winding 170 on core 150. The product which results from the multiplication operation is the total number of output pulses from the multivibrator 10, which is available at winding 124. Thus, if the bias is set so that the counter 140 switches and resets after it receives five pulses, each input pulse then causes the multivibrator 10 to generate five pulses. Thus, if two input pulses are provided, then two five pulse trains or a total of ten output pulses are produced by the multivibrator. Thus, $2\times5=10$, which is the product.

What is claimed is:

1. A pulse counting circuit including a first bistable magnetic core, a first semiconductor device having first input and first output electrodes, said first output electrode being coupled to said first core through a first winding, and said first input electrode being coupled to said first core through a second winding, a second semiconductor device having second input and second output electrodes, said second output electrode being coupled through a third winding to said first core, and said second input electrode being coupled through a fourth winding to said first core, an input trigger pulse source connected to said first input electrode of said first device so that each input pulse can turn on said first device, a first output winding on said first core coupled to a second input winding on a second bistable magnetic core, an adjustable voltage bias winding on said second core which is adjustable to provide a variable bias on said second core, said bias determining the number of voltage steps required to be applied to said second core to cause it to switch from one stable state to the opposite stable state, and a second output winding on said second core coupled to said first input electrode of said first device such that, when said second core switches states, a pulse is coupled to said first device to disable it and to disable said free-running multivibrator, said first winding being oriented on said first core so that when said first device is turned on and first current flows therethrough, it can switch said first core to one of its stable states, said fourth winding being oriented to generate a voltage, when said first core switches, to turn on said second device and thereby to produce second current flow in said third winding, said second current flow switching said first core to its second stable state, said second winding being oriented so that said switching of said first core to said second stable state produces third current flow therein which turns on said first device and produces said first current flow again to switch said first core back to said one stable state, the switching of said first core to its two stable states continuing thus so that said core and its windings and said devices operate as a free-running multivibrator.

2. The circuit defined in claim 1 and including a third semiconductor device in operative relation with said second core and having third input and third output electrodes, said third input electrode being connected to a fifth winding on said second core oriented so that, when said second core switches, a voltage is generated at said third input electrode which turns on said third device, said third output electrode being connected to a winding on said second core oriented so that, when said third device turns on, it generates a current which causes said second core to switch back in the opposite direction.

References Cited

UNITED STATES PATENTS

| | | | |
|---|---|---|---|
| 3,164,728 | 1/1965 | Harding | 307—88 |
| 3,226,562 | 12/1965 | Neitzert | 307—88 |
| 3,229,121 | 1/1966 | Schmidt | 307—282 XR |
| 3,299,292 | 1/1967 | Clark | 307—282 |

BERNARD KONICK, Primary Examiner

G. M. HOFFMAN, Assistant Examiner

U.S. Cl. X.R.

307—282, 314